US011221580B2

(12) United States Patent
Okamoto (10) Patent No.: US 11,221,580 B2
(45) Date of Patent: Jan. 11, 2022

(54) IMAGE FORMING APPARATUS THAT ESTABLISHES SHORT-RANGE WIRELESS COMMUNICATION BETWEEN THE IMAGE FORMING APPARATUS AND AN EXTERNAL DEVICE

(71) Applicant: Brother Kogyo Kabushiki Kaisha, Nagoya (JP)

(72) Inventor: Yoshihiro Okamoto, Komaki (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 0 days.

(21) Appl. No.: 16/795,671

(22) Filed: Feb. 20, 2020

(65) Prior Publication Data

US 2020/0285188 A1    Sep. 10, 2020

(30) Foreign Application Priority Data

Mar. 4, 2019    (JP) .............................. JP2019-038858

(51) Int. Cl.
*G03G 15/00*    (2006.01)
*G03G 21/00*    (2006.01)
*H04N 1/00*    (2006.01)
*G03G 21/16*    (2006.01)

(52) U.S. Cl.
CPC ......... *G03G 15/80* (2013.01); *G03G 15/5066* (2013.01); *G03G 21/1619* (2013.01); *G03G 21/1652* (2013.01); *H04N 1/00559* (2013.01)

(58) Field of Classification Search
CPC .... G03G 15/5066; G03G 15/80; G03G 21/16; G03G 21/1604; G03G 21/1619; G03G 21/1652; G03G 21/1657; G03G 2215/00088; G03G 2221/1696; B41J 29/00; B41J 29/02; H04N 1/00; H04N 1/00559

See application file for complete search history.

(56) References Cited

U.S. PATENT DOCUMENTS

| | | | |
|---|---|---|---|
| 10,929,521 B2* | 2/2021 | Yoshino | B41J 29/00 |
| 2013/0141758 A1* | 6/2013 | Yoneda | G03G 15/80 |
| | | | 358/1.15 |
| 2013/0286433 A1 | 10/2013 | Matsushima et al. | |
| 2014/0147154 A1* | 5/2014 | Arai | G03G 15/5066 |
| | | | 399/75 |

(Continued)

FOREIGN PATENT DOCUMENTS

| | | |
|---|---|---|
| JP | 60-48224 B2 | 12/2016 |
| JP | 2017-068278 A | 4/2017 |

*Primary Examiner* — Sophia S Chen
(74) *Attorney, Agent, or Firm* — Burr & Brown, PLLC (57) ABSTRACT

An image forming apparatus includes a first casing, a second casing, a support portion, an indication, and a USB port. The first casing includes a sheet discharge tray disposed at a top surface thereof. The indication is located at a portion of one of the top surface of the first casing and the support portion, and is positioned outside the sheet discharge tray in a width direction. The portion is located closer to one end of the image forming apparatus in the width direction than the other end of the image forming apparatus opposite to the one end in the width direction. The USB port is disposed at a portion of one of the second casing and the support portion closer to the one end than the other end in the width direction, and is located at a different position in an up-down direction from the indication.

14 Claims, 8 Drawing Sheets

(56) References Cited

U.S. PATENT DOCUMENTS

2014/0253949 A1 9/2014 Tsujimoto
2014/0300915 A1* 10/2014 Ishikura ............ G03G 15/5066
　　　　　　　　　　　　　　　　　　　358/1.13

* cited by examiner

IMAGE FORMING APPARATUS THAT ESTABLISHES SHORT-RANGE WIRELESS COMMUNICATION BETWEEN THE IMAGE FORMING APPARATUS AND AN EXTERNAL DEVICE

CROSS-REFERENCE TO RELATED APPLICATION

This application claims priority from Japanese Patent Application No. 2019-038858 filed on Mar. 4, 2019, the content of which is incorporated herein by reference in its entirety.

TECHNICAL FIELD

Aspects of the disclosure relate to an image forming apparatus.

BACKGROUND

A known image forming apparatus is configured to perform short-range wireless communication with an external device, such as an IC card and a smartphone, in compliance with, for example, a near field communication ("NFC") technology. The known image forming apparatus has a portion to which an external device is brought into proximity for short-range wireless communication. The portion can be seen from above without obstruction.

SUMMARY

In recent years, some image forming apparatuses include a universal serial bus ("USB") port for communication with a USB device, such as a USB memory. Typically, the USB port is located at a front or a side surface of an image forming apparatus for user's convenience. Some image forming apparatuses include both a portion to which an external device is brought into proximity for short-range wireless communication, and a USB port. The portion and the USB port need to be readily identifiable.

Aspects of the disclosure provide an image forming apparatus including a portion to which an external device configured to perform short-range wireless communication is to be brought into proximity and a USB port that are readily identifiable.

According to one or more aspects of the disclosure, an image forming apparatus comprises a first casing, a second casing, a support portion, an indication, and a USB port. The first casing houses an image forming unit configured to form an image on a sheet. The first casing includes a sheet discharge tray disposed at a top surface thereof. The sheet discharge tray is configured to support the sheet discharged by a discharge roller. The second casing is disposed above the first casing. The second casing houses an image scanner configured to scan an image on a document. The support portion is disposed at the top surface of the first casing such that the support portion raises the second casing. The support portion partially defines an opening that enables an access to the sheet discharged on the sheet discharge tray. The indication is located at a portion of one of the top surface of the first casing and the support portion. The indication is positioned outside the sheet discharge tray in a width direction perpendicular to a discharging direction of the sheet by the discharge roller. The portion is located closer to one end of the image forming apparatus in the width direction than the other end of the image forming apparatus opposite to the one end in the width direction. The indication indicates a location to which an external device is to be brought into proximity to establish short-range wireless communication between the image forming apparatus and the external device. The USB port is disposed at a portion of one of the second casing and the support portion closer to the one end than the other end in the width direction. The USB port is located at a different position in an up-down direction from the indication.

According to one or more aspects of the disclosure, an image forming apparatus comprises a first casing, a second casing, a support portion, and a third casing. The first casing houses an image forming unit configured to form an image on a sheet. The first casing includes a sheet discharge tray disposed at a top surface thereof. The sheet discharge tray is configured to support the sheet discharged by a discharge roller. The second casing is disposed above the first casing. The second casing houses an image scanner configured to scan an image on a document. The support portion is disposed at the top surface of the first casing such that the support portion raises the second casing. The support portion partially defines an opening that enables an access to the sheet discharged on the sheet discharge tray. The third casing is configured to be removably attached to the image forming apparatus. The third casing is positioned outside the sheet discharge tray in a width direction perpendicular to a discharging direction of the sheet by the discharge roller. The third casing includes an indication and a USB port that are located at different surfaces of the third casing. The indication indicates a location to which an external device is to be brought into proximity to establish short-range wireless communication between the image forming apparatus and the external device.

DETAILED DESCRIPTION

Figure 1:
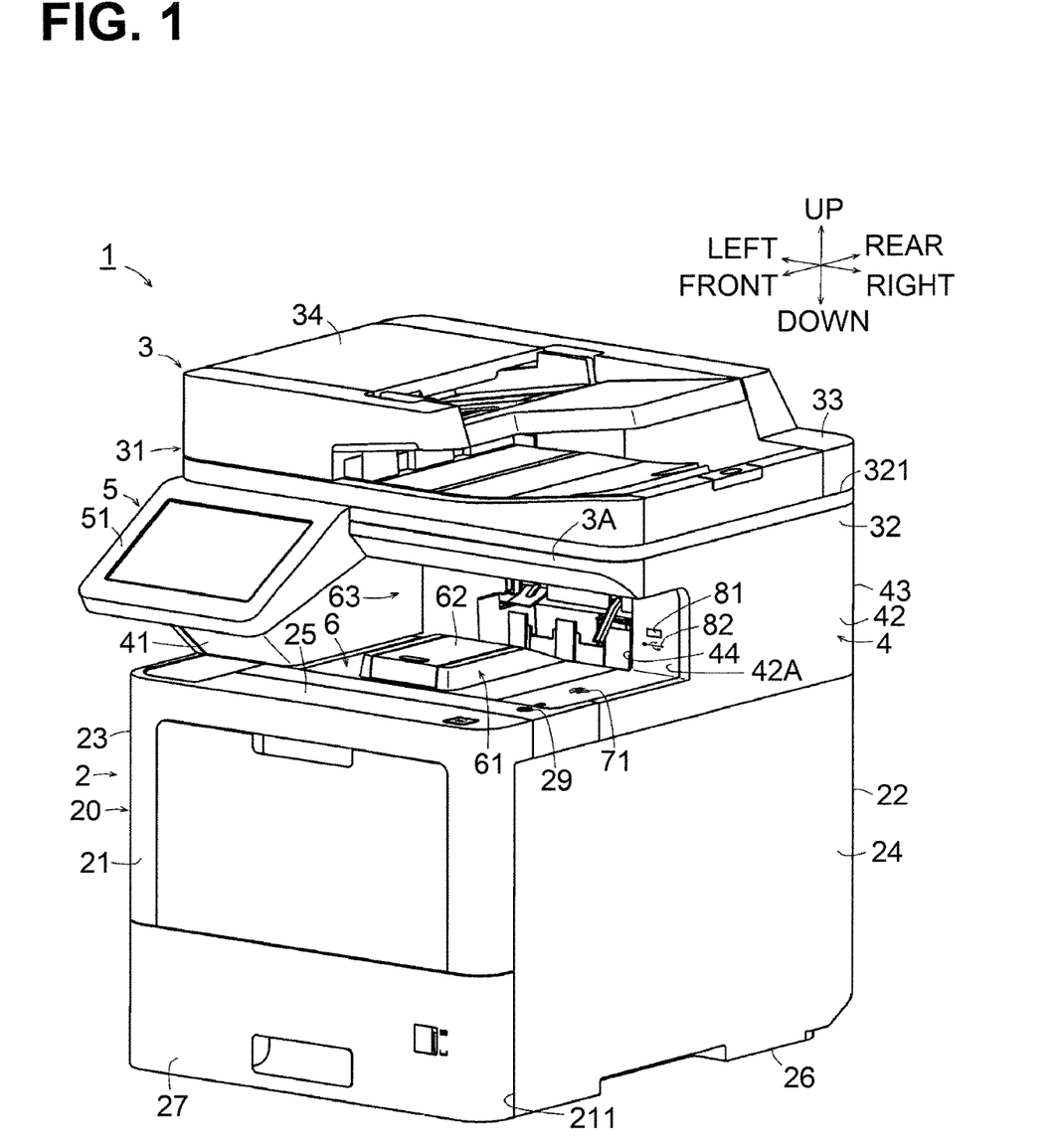
FIG. 1 is a perspective view of an image forming apparatus in an illustrative embodiment according to one or more aspects of the disclosure.

Respective directions of front, rear, left, right, top/upper, and bottom/lower are defined in conjunction with an orientation in which an image forming apparatus 1 is intended to be used, as depicted in FIG. 1. A side of the image forming apparatus 1 having a front surface 21 may be defined as a front side, and a side opposite to the front side may be defined as a rear side. A left side and a right side of the image forming apparatus 1 may be defined with respect to the image forming apparatus 1 as viewed from its front side. A side of the image forming apparatus 1 on which a second casing 3 is disposed is the upper side. A side of the image forming apparatus 1 on which a first casing 2 is disposed is the lower side. In the illustrative embodiment, the left-right direction is an example of a width direction perpendicular to a discharging direction of a sheet by discharge rollers 28.

[Configuration of Image Forming Apparatus]

Figure 2:
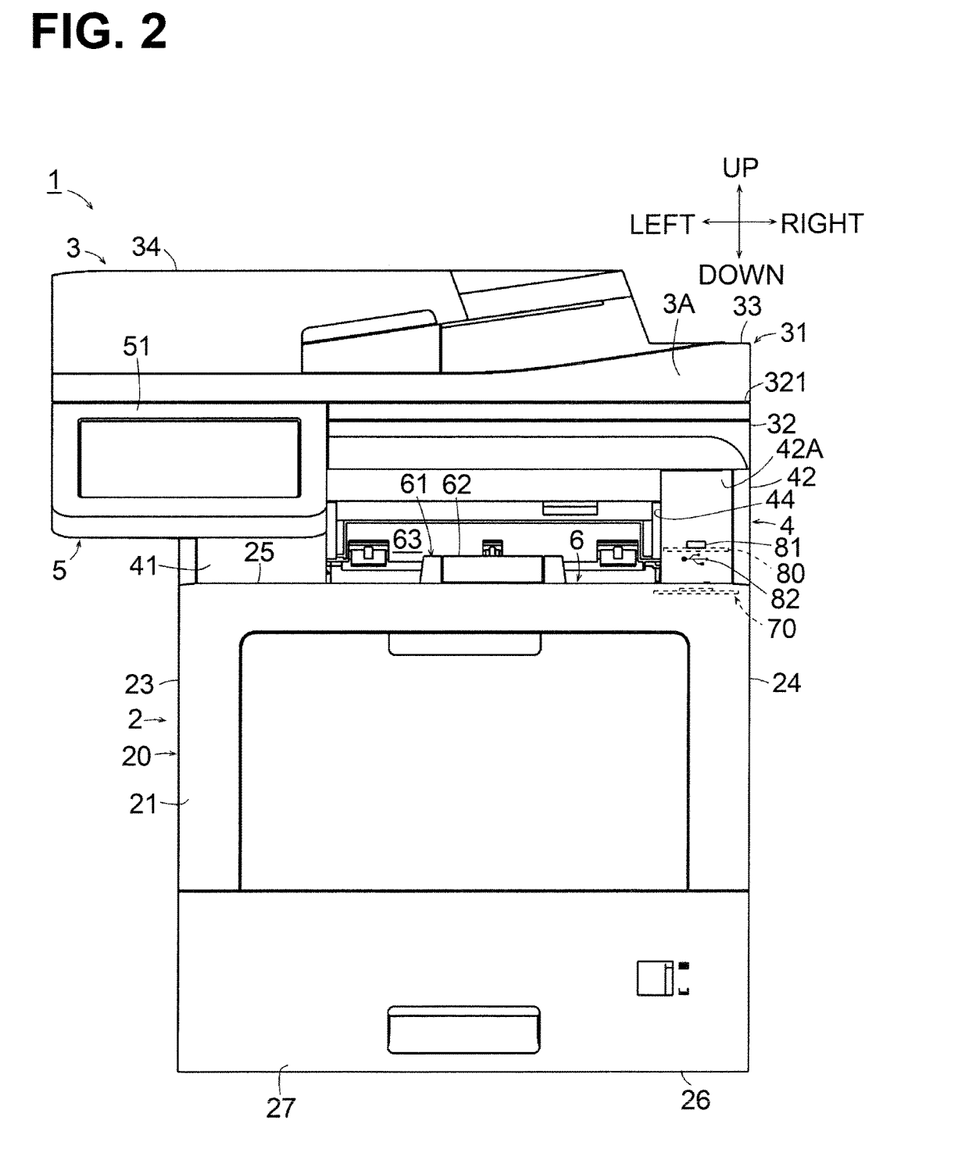
FIG. 2 is a front view of an image forming apparatus in an illustrative embodiment according to one or more aspects of the disclosure.
Figure 3:
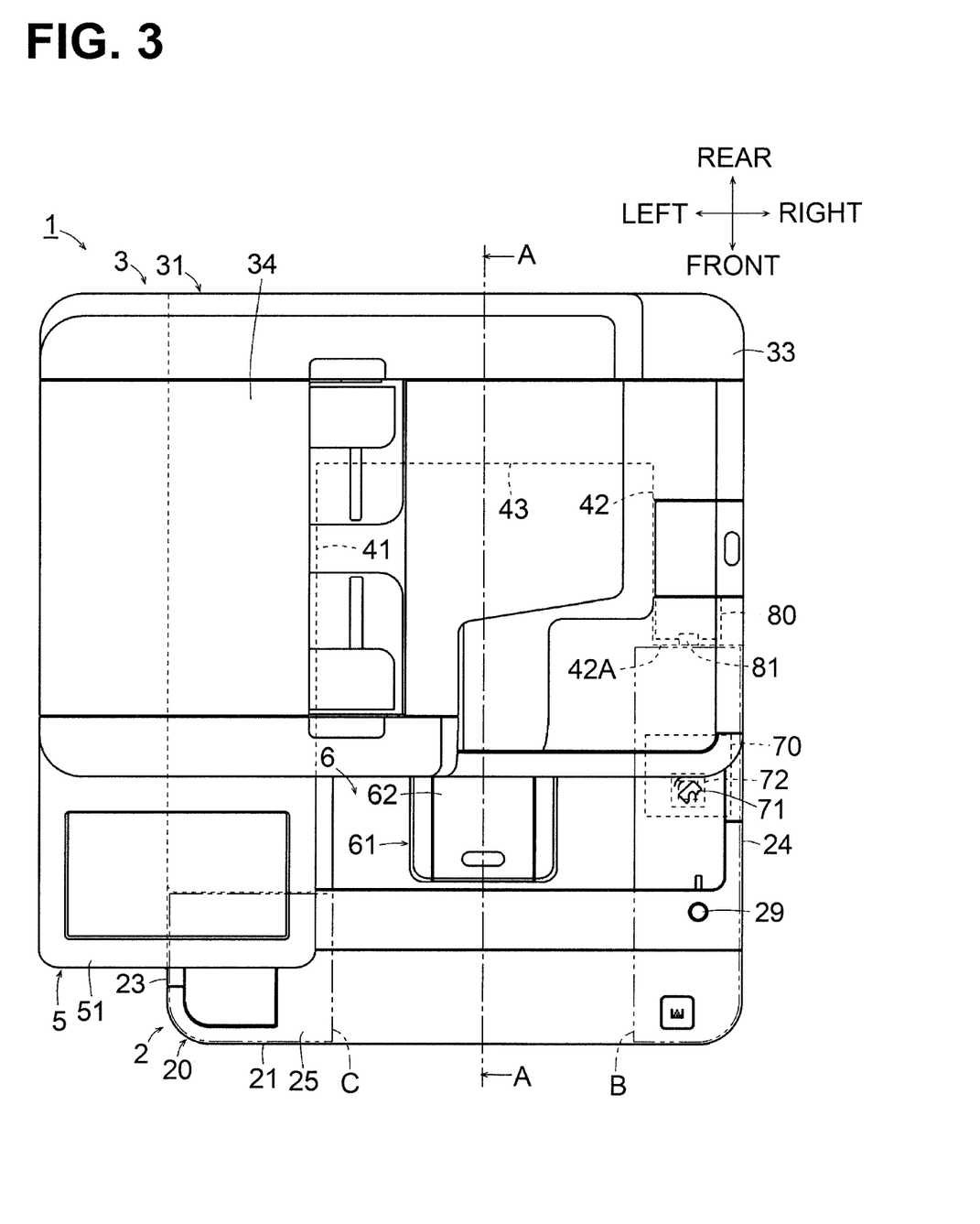
FIG. 3 is a top view of an image forming apparatus in an illustrative embodiment according to one or more aspects of the disclosure.
Figure 4:
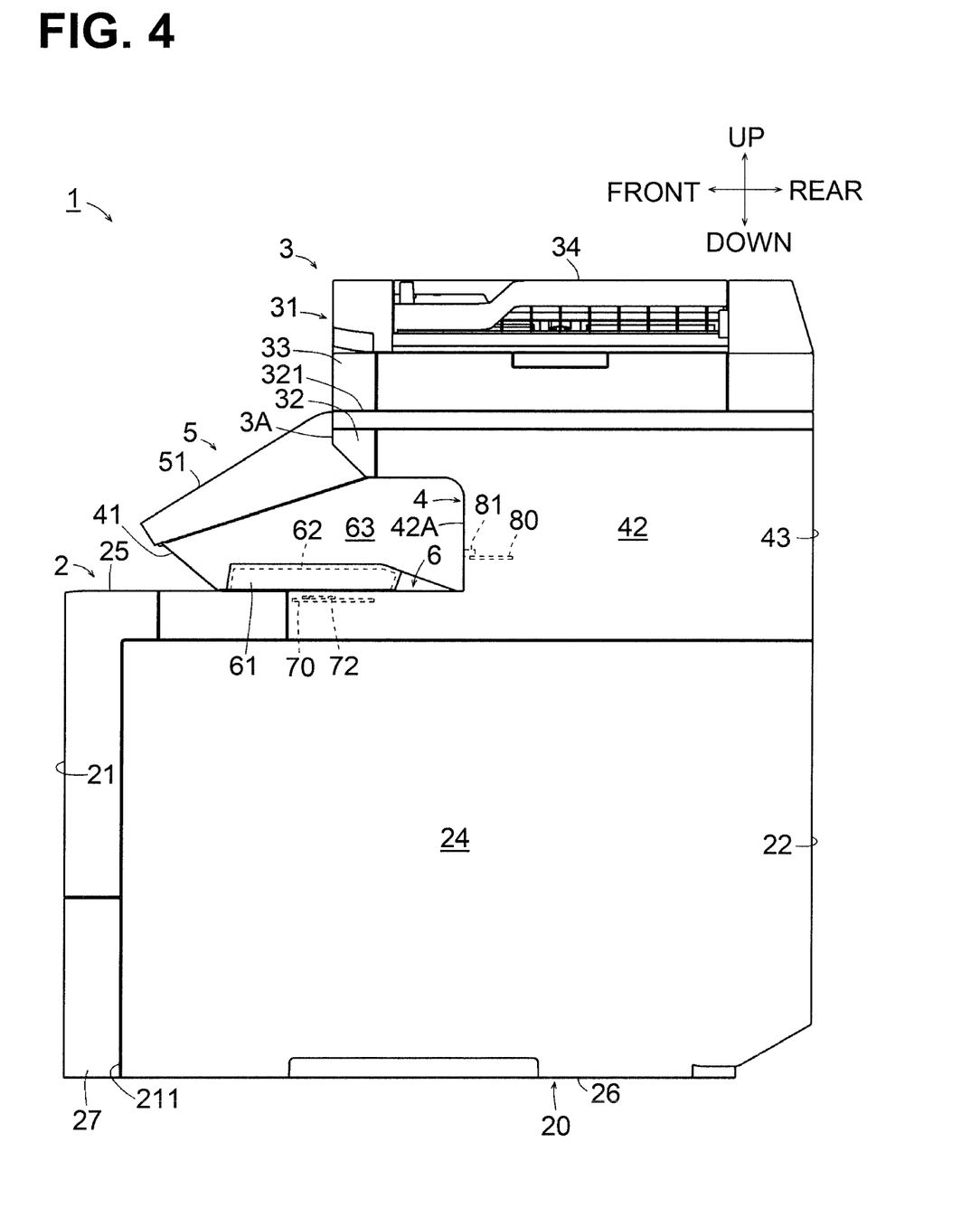
FIG. 4 is a right side view of an image forming apparatus in an illustrative embodiment according to one or more aspects of the disclosure.
Figure 5:
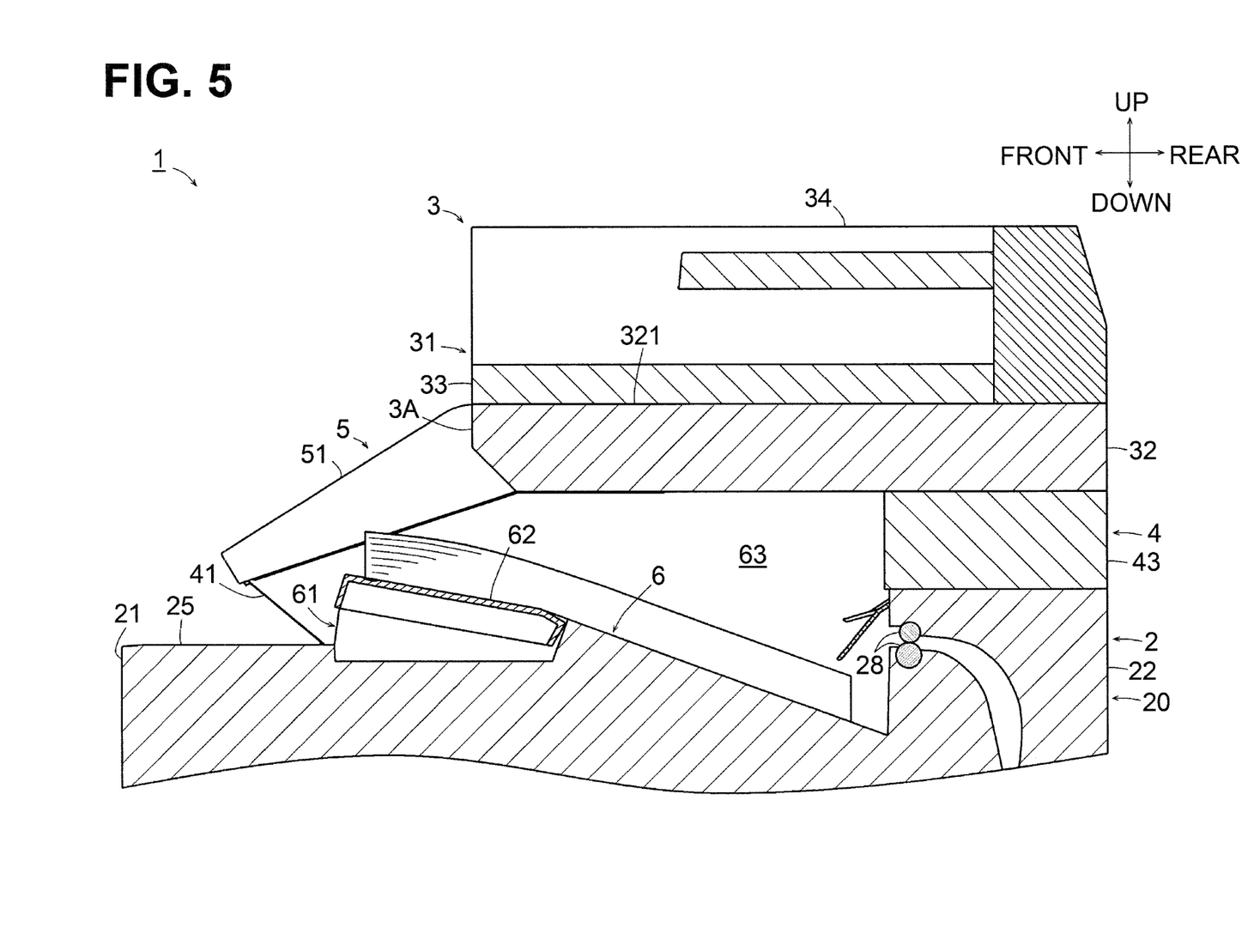
FIG. 5 is a cross-sectional view of the image forming apparatus of FIG. 3, taken along a line A-A, illustrating a discharged sheet stopper is in a use position.

FIG. 1 is a perspective view of the image forming apparatus 1 according to an illustrative embodiment. FIG. 2 is a front view of the image forming apparatus 1. FIG. 3 is a top view of the image forming apparatus 1. FIG. 4 is a right side view of the image forming apparatus 1. FIG. 5 is a cross-sectional view of the image forming apparatus 1, taken along a line A-A of FIG. 3, illustrating a discharged sheet stopper 62 is in a use position. The image forming apparatus 1 employs an interior sheet discharge system. The image forming apparatus 1 includes the first casing 2, the second casing 3, a support portion 4, and a control panel 5.

The first casing 2 includes a cover 20 having a generally rectangular parallelepiped shape. The cover 20 defines an appearance of the first casing 2. The cover 20 includes the front surface 21, a rear surface 22, a left surface 23, a right surface 24, a top surface 25, and a bottom surface 26. The cover 20 has an opening 211 at a lower portion of the front surface 21. Through the opening 211, a sheet tray 27 is attached or removed.

The first casing 2 houses the sheet tray 27 configured to support a stack of one or more sheets, a conveying mechanism configured to convey a sheet from the sheet tray 27, an image forming unit configured to form an image on the sheet conveyed by the conveying mechanism, a sheet discharge mechanism configured to discharge the sheet from the image forming unit to an exterior of the first casing 2. The sheet discharge mechanism includes the discharge rollers 28 disposed at a most downstream portion thereof in a sheet conveying direction (e.g., the sheet discharging direction).

The sheet tray 27 is configured to move in a front-rear direction between a fully attached position (as depicted in FIG. 1) and a separated position. At the fully attached position, the sheet tray 27 is fully attached to the first casing 2 through the opening 211. At the separated position, the sheet tray 27 is at least partially separated or removed from the first casing 2 toward the front through the opening 211. The image forming unit may form an image based on, but not limited to, an electrophotographic method, an inkjet method, or other method.

A sheet discharge tray 6 is located at the top surface 25 of the first casing 2. The sheet discharge tray 6 is configured to receive a sheet discharged by the sheet discharge mechanism. The sheet discharge tray 6 is formed on the top surface 25 of the first casing 2 into a convex shape curving upward from the rear side toward the front side. The sheet having an image formed thereon may be discharged by the sheet discharge mechanism in a rear-to-front direction onto the sheet discharge tray 6.

The sheet discharge tray 6 includes a protruding portion 61 disposed at a central portion thereof in the width direction, and the discharged sheet stopper 62 disposed at the protruding portion 61. The protruding portion 61 protrudes upward relative to other areas of the sheet discharge tray 6. The protruding portion 61 has a trapezoidal shape whose rear portion is inclined downwardly. The discharged sheet stopper 62 has a generally rectangular plate shape. The discharged sheet stopper 62 has a rear end portion that is pivotally supported by the protruding portion 61. The discharged sheet stopper 62 is configured to move between an accommodated position (as depicted in FIG. 4) and a use position (as depicted in FIG. 5). At the accommodated position, the discharged sheet stopper 62 is flush with the upper end portion of the protruding portion 61. At the use position, a front end portion of the discharged sheet stopper 62 is raised. When the discharged sheet stopper 62 is in the use position, a sheet discharged onto the sheet discharge tray 6 may contact the discharged sheet stopper 62, so that the position of the sheet on the sheet discharge tray 6 may be regulated.

In a case where the sheet discharged on the sheet discharge tray 6 has curling ends, in the width direction, that curl upward, the protruding portion 61 raises and supports the central portion of the sheet in the width direction and may reduce the curling. When a stack of one or more sheets is supported on the sheet discharge tray 6, a space is provided below the stack near the protruding portion 61. The space may allow a user to hold the stack. The protruding portion 61 may not necessarily be provided but may be omitted.

The image forming apparatus 1 includes a power switch 29 disposed at the top surface 25 of the first casing 2. For easy recognition and operation, the power switch 29 may preferably be disposed at a portion of the top surface 25 of the first casing 2 further toward the front than the discharged sheet stopper 62 and outside an area of the sheet discharge tray 6 in the width direction. In the illustrative embodiment, the power switch 29 is located at a right front portion of the top surface 25.

The second casing 3 is disposed above the first casing 2 and includes a document scanner 31. The document scanner 31 includes a scanner casing 32. The scanner casing 32 includes a document glass 321 on an upper surface thereof. The document glass 321 is configured to support a document. The scanner casing 32 houses an image scanner configured to scan an image on the document supported by the document glass 321. The document scanner 31 further includes a document cover 33 disposed above the scanner casing 32. The document cover 33 is configured to pivotally move about a pivot axis provided at a rear end portion of the document cover 33 between a closed position and an open position. At the closed position, a front end portion of the document cover 33 is pivotally moved down and the document cover 33 covers the document glass 321. At the open position, the front end portion of the document cover 33 is pivotally moved up and the document cover 33 uncovers the document glass 321. The document cover 33 includes an auto document feeder ("ADF") 34 disposed at an upper portion thereof. The ADF 34 is configured to automatically feed a document to the document glass 321.

The support portion 4 includes a left support portion 41, a right support portion 42, and a rear support portion 43. The left support portion 41, the right support portion 42, and the rear support portion 43 are respectively disposed at a left end portion, a right end portion, and a rear end portion of the top surface 25 of the first casing 2, raising the second casing 3. The second casing 3 is disposed above the sheet discharge tray 6 via a discharge space 63 in which a sheet is discharged. The left support portion 41, the right support portion 42, the top surface 25 of the first casing 2, and a lower surface of the second casing 3 define an open portion 44 at a front side of the image forming apparatus 1. The discharge space 63 is open toward the front, via the open portion 44. A user can be accessible to a sheet discharged onto the sheet discharge tray 6 via the open portion 44.

In illustrative embodiment, the right support portion 42 includes a front end surface 42A that is located further to the rear than a front end surface 3A of the second casing 3. The configuration may allow a right portion of the discharge space 63 to open widely, allowing a user to take a stack of one or more sheets discharged on the sheet discharge tray 6 from the right side of the image forming apparatus 1.

The control panel 5 has a substantially rectangular parallelepiped shape. The control panel 5 has a dimension in the width direction equal to or less than a half of the dimension of the second casing 3 in the width direction. The control panel 5 extends frontward from the front end surface 3A of the second casing 3 such that a left end portion of the control panel 5 is flush with a left end portion of the second casing 3. The control panel 5 is configured to enable operations of the image forming apparatus 1. The control panel 5 includes an upper surface 51 on which a display, such as an LCD panel, and an input device, such as a touchscreen and keys/buttons, configured to operate the image forming unit and the image scanner, are disposed.

[NFC]

As depicted in FIG. 3, the first casing 2 has an NFC indication 71 provided, e.g., printed, on the top surface 25 of the first casing 2. The NFC indication 71 indicates a location to which an external device (e.g., an IC card and a smartphone) having an NFC function is to be brought into proximity to establish a wireless communication between the image forming apparatus 1 and the external device. The size and the shape of the NFC indication 71 are not limited to a particular size and shape. The NFC indication 71 may be provided in a manner other than printing. For example, the NFC indication 71 may include translucent member. The translucent member may illuminate the NFC indication 71 with a light source (e.g., a light-emitting diode) disposed under the translucent member. Using the NFC indication 71 as a guide, a user may bring the external device into proximity to the NFC indication 71, thereby establishing a wireless communication between the external device and the image forming apparatus 1.

The NFC indication 71 may be located in an area B or an area C as depicted in FIG. 3. The area B is a portion of the top surface 25 of the first casing 2 outside the sheet discharge tray 6 in the width direction and to the right of the sheet discharge tray 6. In other words, the area B is a right portion of the top surface 25 of the first casing 2 outside the sheet discharge tray 6 in the width direction. The area C is a portion of the top surface 25 of the first casing 2 outside the sheet discharge tray 6 in the width direction and to the left of the sheet discharge tray 6. In other words, the area C is a left portion of the top surface 25 of the first casing 2 outside the sheet discharge tray 6 in the width direction. In the illustrative embodiment, the NFC indication 71 is located in the area B in front of the front end surface 42A of the right support portion 42 with a distance between the front end surface 42A and the NFC indication 71.

The NFC indication 71 may not be covered by a sheet discharged on the sheet discharge tray 6. This may ensure visibility of the NFC indication 71. Further, since the NFC indication 71 is disposed closer to a user, the user may readily bring an external device into proximity to the NFC indication 71.

An NFC board 70 is located, facing the NFC indication 71, inside the first casing 2, to establish a favorable wireless communication between the image forming apparatus 1 and the external device. In the illustrative embodiment, the NFC board 70 is disposed under the NFC indication 71 along an inner surface (e.g., a lower surface) of the top surface 25 of the cover 20. The NFC board 70 is a circuit board having a generally rectangular shape. The NFC board 70 includes a loop antenna 72 and circuits, such as a communication circuit and a detection circuit.

The loop antenna 72 is disposed on an upper surface of the NFC board 70 such that the loop antenna 72 is located under the NFC indication 71. The loop antenna 72 is configured to transmit to or receive from an external device, radio waves for NFC communication. The communication circuit is configured to process the radio waves transmitted to or received from the external device into signals. The detection circuit is configured to detect a current that flows in the loop antenna 72, thereby detecting intensities of the radio waves transmitted or received by the loop antenna 72.

[USB]

As depicted in FIG. 2, the image forming apparatus 1 includes a USB port 81 to which a terminal of a USB device, such as a USB memory and a digital camera, is connectable. The USB port 81 is located in the support portion 4 on the same side (e.g., a right side) of the image forming apparatus 1 as the NFC indication 71 in the width direction. In other words, the USB port 81 and the NFC indication 71 are located closer to one end (e.g., a right end) of the image forming apparatus 1 in the width direction than the other end (e.g., a left end) of the image forming apparatus 1 opposite to the one end in the width direction. In the illustrative embodiment, the NFC indication 71 is located on the right side of the image forming apparatus 1 in the width direction and the USB port 81 is located in the front end surface 42A of the right support portion 42. As long as a USB device is connectable to the USB port 81 from the front, the position of the USB port 81 at the front end surface 42A of the right support portion 42 may not be limited to a particular position.

The right support portion 42 has a USB indication 82 provided, e.g., printed, at a portion of the front end surface 42A near the USB port 81. As long as the USB indication 82 is located near the USB port 81, the USB indication 82 may be provided, for example, at a portion of the top surface 25 of the cover 20 below the USB port 81 and further to the front than the USB port 81. The USB indication 82 or the USB port 81 may help a user to recognize the location of the USB port 81.

The USB port 81 at the front end surface 42A of the right support portion 42 may not be covered by a sheet discharged on the sheet discharge tray 6. This may ensure visibility of the USB port 81. The NFC indication 71 and the USB port 81 are both disposed closer to the one end (e.g., the right end) of the image forming apparatus 1 in the with direction than the other end (e.g., the left end) of the image forming apparatus 1 in the width direction. This configuration may allow a user to readily identify both the NFC indication 71 and the USB port 81 by looking in one direction. The NFC indication 71 and the USB port 81 are spaced in the up-down direction. This configuration may prevent or reduce interference between a USB device inserted into the USB port 81 and an external device brought into proximity to the NFC indication 71. This may lead to increased operability.

Since the USB port 81 is provided at the front end surface 42A of the right support portion 42, a space in front of the right support portion 42 may be effectively used. The front end surface 42A of the right support portion 42 is located further toward the rear than the front end surface 3A of the second casing 3. This configuration may prevent a USB device inserted into the USB port 81 from sticking out relative to the second casing 3 when viewed from the top, thereby preventing or reducing risks of damaging the USB device as a user hits the USB device.

The USB port 81 may preferably be located at a position overlapping with the first casing 2 when viewed from the top. This configuration may prevent a USB device inserted into the USB port 81 from sticking out relative to the first casing 2 when viewed from the top, thereby preventing or reducing risks of damaging the USB device as a user hits the USB device. In the illustrative embodiment, the USB port 81 at any portion of the front end surface 42A of the second casing 3 is located at a position overlapping with the first casing 2 when viewed from the top. Further, the USB port 81 at any portion of a front end surface of the left support portion 41 is located at a position overlapping with the first casing 2 when viewed from the top.

The USB port 81 and the NFC indication 71 may be preferably located on one side (e.g., the right side) of the image forming apparatus 1 in the width direction and the control panel 5 may be disposed on the other side (e.g., the left side) of the image forming apparatus 1 in the width direction. In other words, the USB port 81 and the NFC indication 71 may be located closer to one end of the image forming apparatus 1 in the width direction and the control panel 5 may be located closer to the other end of the image forming apparatus 1 in the width direction. Since the one end and the other end of the image forming apparatus 1 are opposite to each other in the width direction, the USB port 81 and the NFC indication 71 may be located opposite to the control panel 5 in the width direction. The control panel 5 may not cover the USB port 81 or the NFC indication 71. This may ensure visibility of the USB port 81 and the NFC indication 71. In the illustrative embodiment, the USB port 81 at any portion of the front end surface 42A of the right support portion 42 is located opposite to the control panel 5 in the width direction. Further, the NFC indication 71 at any portion of the area B is located opposite to the control panel 5 in the width direction.

A USB board 80 is located inside the right support portion 42. The USB board 80 is a circuit board having a generally rectangular shape. The USB board 80 includes the USB port 81 and circuits. The USB port 81 is disposed on an upper surface of the USB board 80 and protrudes frontward.

The power switch 29 is located on the same side (e.g., the right side) of the image forming apparatus 1 as the NFC indication 71 and the USB port 81 in the width direction. In other words, the power switch 29 is located closer to the one end (e.g., the right end) of the image forming apparatus 1 in the width direction than the other end (e.g., the left end) of the image forming apparatus opposite to the one end in the width direction. The NFC indication 71, the USB port 81, and the power switch 29 are located closer to the one end of the image forming apparatus 1 in the with direction than the other end of the image forming apparatus 1 in the with direction. This configuration may allow a user to readily identify the NFC indication 71, the USB port 81, and the power switch 29 by looking in one direction.

[First Modification]

Figure 6:
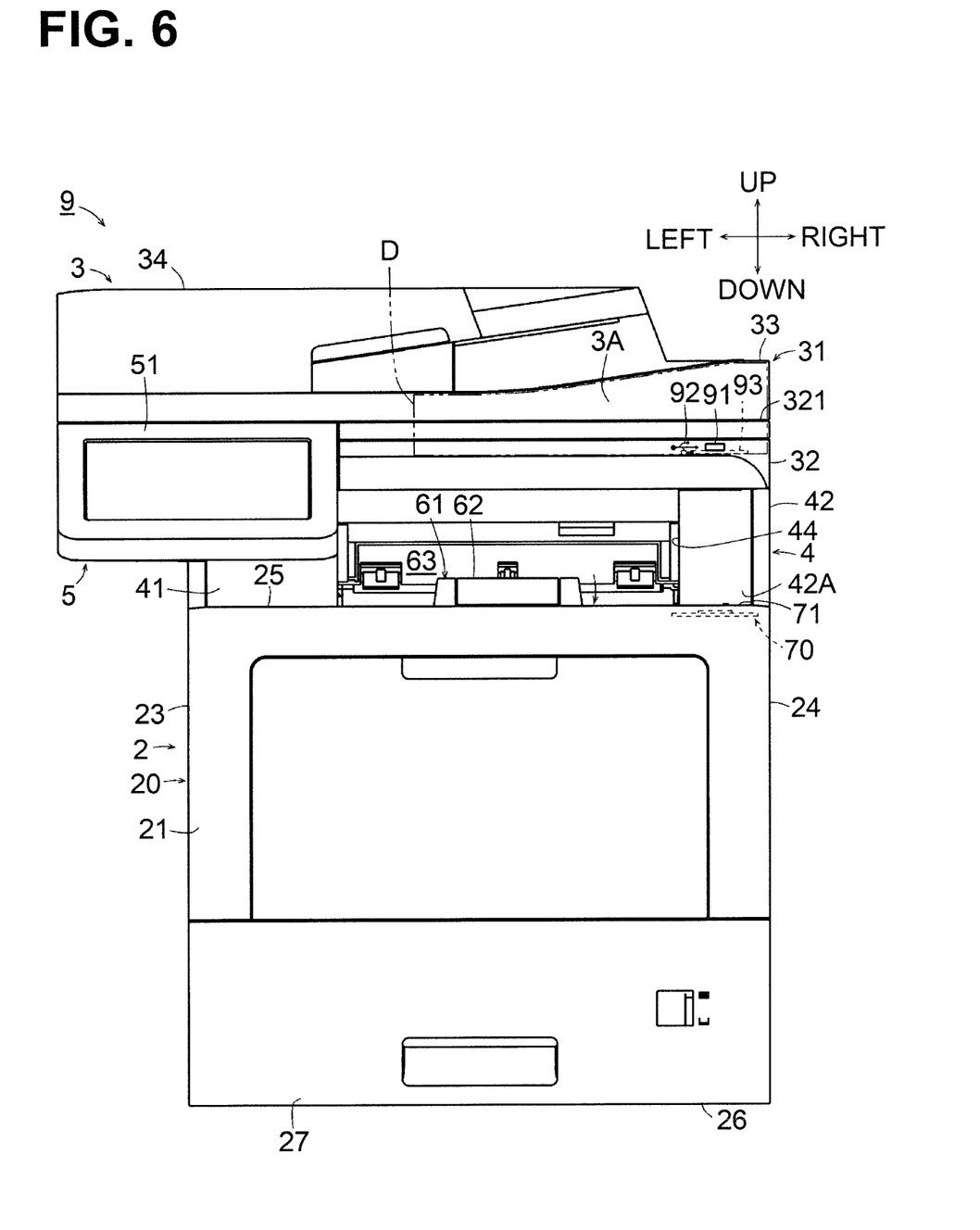
FIG. 6 is a front view of an image forming apparatus in a first modification according to one or more aspects of the disclosure.

FIG. 6 is a front view of an image forming apparatus 9 according to a first modification. The image forming apparatus 9 according to the first modification is different from the image forming apparatus 1 with respect to positions of a USB port 91, a USB indication 92, and a USB board 93. Except for the positions of the USB port 91, the USB indication 92, and the USB board 93, the image forming apparatus 9 has the same or similar configuration as the image forming apparatus 1. Like numerals in the drawings denote like components and the detailed description of those components described above is omitted, with respect to FIGS. 6-8.

The USB port 91 is located at the second casing 3 on the same side (e.g., the right side) of the image forming apparatus 9 as the NFC indication 71 in the width direction. In other words, the USB port 91 and the NFC indication 71 are both located closer to one end (e.g., a right end) of the image forming apparatus 9 in the width direction than the other end (e.g., a left end) of the image forming apparatus 9 opposite to the one end in the width direction. In the first modification, the NFC indication 71 is located on the right side of the image forming apparatus 9 in the width direction and the USB port 91 is located at a right end portion of the front end surface 3A of the second casing 3. As long as a USB device is connectable to the USB port 91 from the front, the USB port 91 may be disposed at any portion of a right half D of the front end surface 3A of the second casing 3.

The front end surface 3A of the second casing 3 has the USB indication 92 near the USB port 91. The USB board 93 has the same or similar configuration as the USB board 80 and is located inside the second casing 3.

The USB port 91 at the front end surface 3A of the second casing 3 may not be covered by a sheet discharged on the sheet discharge tray 6. This may ensure visibility of the USB port 91. The NFC indication 71 and the USB port 91 are both located closer to the one end (e.g., the right end) of the image forming apparatus 9 in the width direction than the other end of the image forming apparatus 9 in the width direction. This configuration may allow a user to readily identify both the NFC indication 71 and the USB port 91 by looking in one direction.

The NFC indication 71 and the USB port 91 are spaced in the up-down direction. This configuration may prevent or reduce interference between a USB device inserted into the USB port 91 and an external device brought into proximity to the NFC indication 71. This may lead to increased operability.

The USB port 91 may preferably be located at a position overlapping with the first casing 2 when viewed from the top. This configuration may prevent a USB device inserted into the USB port 91 from sticking out relative to the first casing 2 when viewed from the top, thereby preventing or reducing risks of damaging the USB device as a user hits the USB device. In the first modification, the front end surface 3A of the second casing 3 is located further to the rear than the front surface 21 of the first casing 2. The USB port 91 at any portion of the right half D of the front end surface 3A of the second casing 3 is located at a position overlapping with the first casing 2 when viewed from the top.

The USB port 91 and the NFC indication 71 may be preferably located opposite to the control panel 5 in the width direction. This configuration may ensure operability of the control panel 5 because a USB device inserted into the USB port 91 may not stick out over the control panel 5. The control panel 5 may not cover the NFC indication 71, which may ensure visibility of the NFC indication 71.

[Second Modification]

Figure 7:
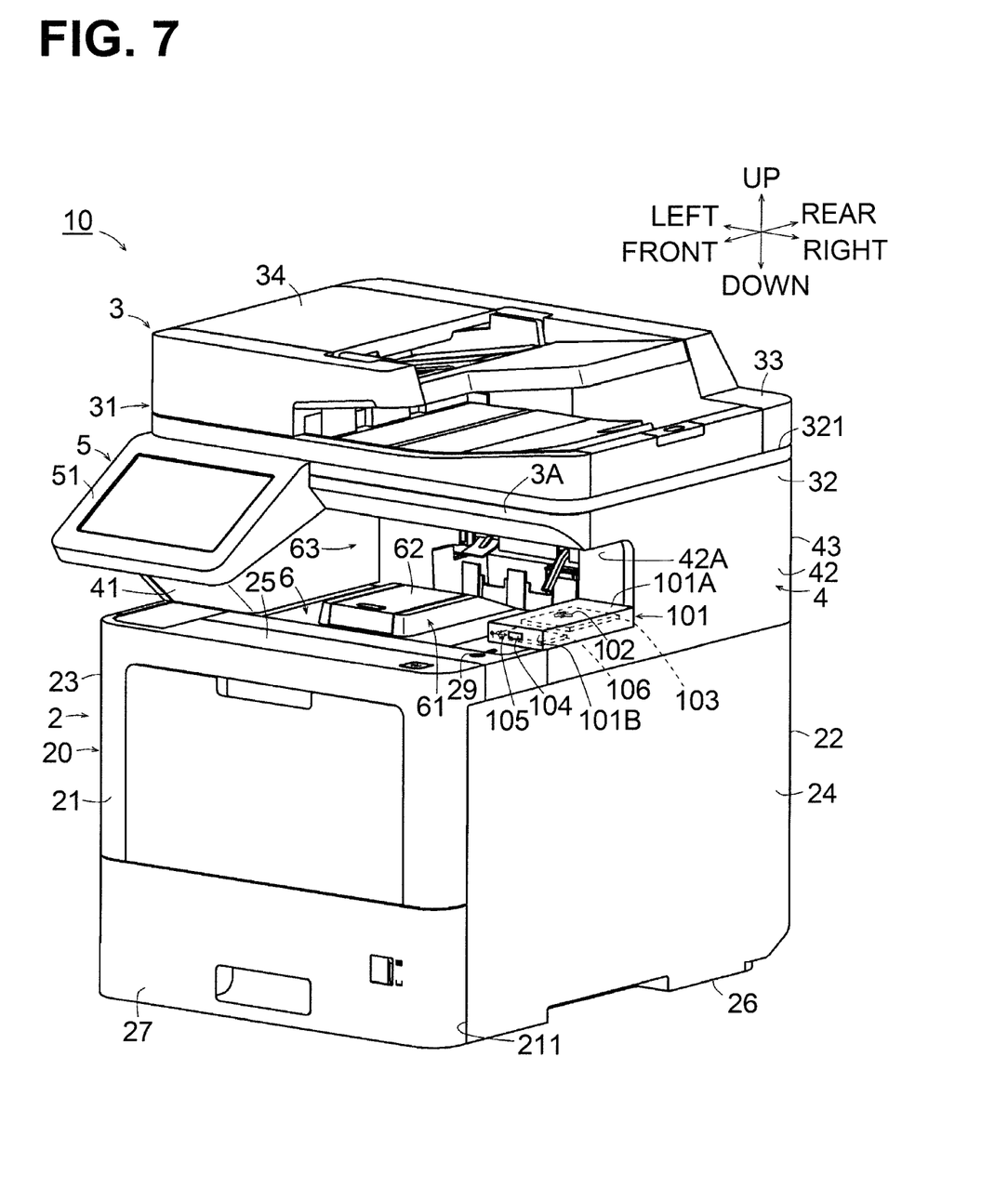
FIG. 7 is a perspective view of an image forming apparatus in a second modification according to one or more aspects of the disclosure.

FIG. 7 is a perspective view of an image forming apparatus 10 according to a second modification. The image forming apparatus 10 according to the second modification is different from the image forming apparatus 1 with respect to the support portion 4 having a third casing 101 and positions of an NFC indication 102, an NFC board 103, a USB port 104, a USB indication 105, and a USB board 106. Except for the third casing 101 and the positions of the components and indications 102-106, the image forming apparatus 10 has the same or similar configuration as the image forming apparatus 1.

The third casing 101 has a generally rectangular parallelepiped shape with the same width as the right support portion 42 of the support portion 4. The third casing 101 serves as a portion of the support portion 4. The third casing 101 is configured to be removably attached to the image forming apparatus 10. The third casing 101 is attached to the image forming apparatus 10 such that a rear surface of the third casing 101 contacts the front end surface 42A of the right support portion 42; a bottom surface of the third casing 101 contacts the top surface 25 of the first casing 2; and a left surface of the third casing 101 is flush with the left surface of the right support portion 42.

The NFC indication 102 and the USB port 104 are disposed at different surfaces of the third casing 101 at different levels (e.g., at different positions in the up-down direction). In FIG. 7, the third casing 101 has a top surface 101A and a front surface 101B. The NFC indication 102 is provided at the top surface 101A. The USB port 104 is disposed at the front surface 101B. The front surface 101B of the third casing 101 has the USB indication 105 near the USB port 104.

Using the NFC indication 102 as a guide, a user may bring an external device into proximity to the top surface 101A of the third casing 101, thereby establishing a wireless communication between the external device and the image forming apparatus 10. The USB indication 105 or the USB port 104 may help a user to recognize the location of the USB port 104.

The NFC board 103 has the same or similar configuration as the NFC board 70 and is located inside the third casing 101, facing the NFC indication 102. The USB board 106 has the same or similar configuration as the USB board 80 and is located inside the third casing 101.

In the second modification, the NFC indication 102 may not be covered by a sheet discharged on the sheet discharge tray 6. This may ensure visibility of the NFC indication 102. Further, since the NFC indication 102 is disposed closer to a user, the user may readily bring an external device into proximity to the NFC indication 102.

The USB port 104 at the front surface 101B of the third casing 101 may not be covered by a sheet discharged on the sheet discharge tray 6. This may ensure visibility of the USB port 104. The NFC indication 102 and the USB port 104 are both located closer to the one end (e.g., the right end) of the image forming apparatus 10 in the width direction than the other end (e.g., the left end) of the image forming apparatus 10 in the width direction. This configuration may allow a user to readily identify both the NFC indication 102 and the USB port 104 by looking in one direction. The NFC indication 102 and the USB port 104 are spaced in the up-down direction. This configuration may prevent or reduce interference between a USB device inserted into the USB port 104 and an external device brought into proximity to the NFC indication 102. This may lead to increased operability.

The USB port 104 may preferably be located at a position overlapping with the first casing 2 when viewed from the top. This configuration may prevent a USB device inserted into the USB port 104 from sticking out relative to the first casing 2 when viewed from the top, thereby preventing or reducing risks of damaging the USB device as a user hits the USB device. In the second modification, the front surface 101B of the third casing 101 is located further to the rear than the front surface 21 of the first casing 2. The USB port 104 at any portion of the front surface 101E of the third casing 101 is located at a position overlapping with the first casing 2 when viewed from the top.

The USB port 104 and the NFC indication 102 may be preferably located opposite to the control panel 5 in the width direction. The control panel 5 may not cover the USB port 104 or the NFC indication 102. This may ensure visibility of the USB port 104 and the NFC indication 102. In the second modification, the third casing 101 is located opposite to the control panel 5 in the width direction. The USB port 104 and the NFC indication 102 at the third casing 101 is located opposite to the control panel 5 in the width direction.

The third casing 101 is configured to be removably attached to the image forming apparatus 10. In some embodiments, an image forming apparatus may be configured to have NFC and USB functions by attaching the third casing 101 to the image forming apparatus or not to have the NFC and USB functions by removing the third casing 101 from the image forming apparatus. The image forming apparatus with different specifications may thus be produced readily.

[Third Modification]

Figure 8:
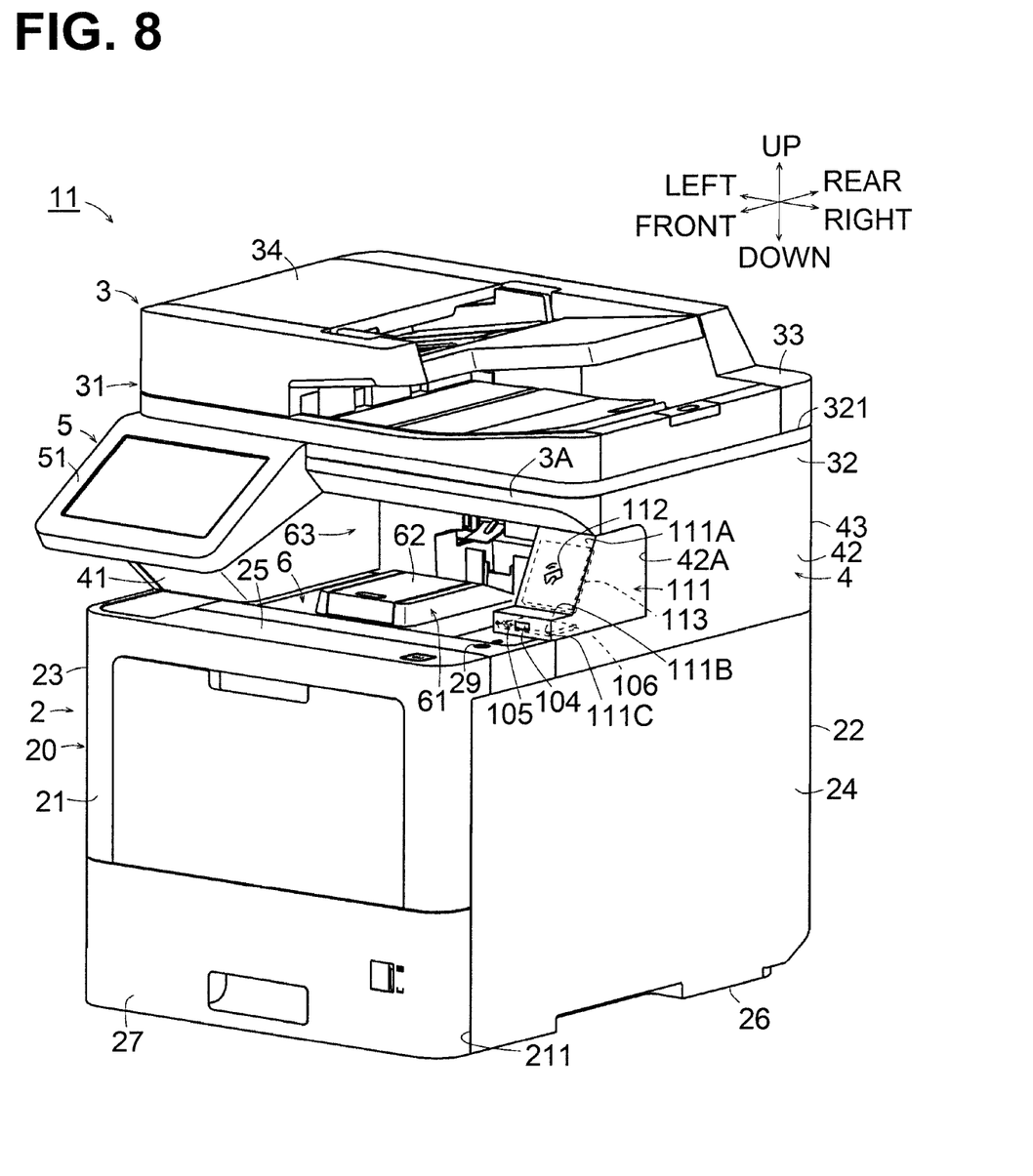
FIG. 8 is a perspective view of an image forming apparatus in a third modification according to one or more aspects of the disclosure.

FIG. 8 is a perspective view of an image forming apparatus 11 according to a third modification. The image forming apparatus 11 according to the third modification is different from the image forming apparatus 10 according to the second modification with respect to the shape of a third casing 111 and positions of an NFC indication 112 and an NFC board 113. Except for the shape of the third casing 111 and the positions of the NFC indication 112 and the NFC board 113, the image forming apparatus 11 has the same or similar configuration as the image forming apparatus 10.

The third casing 111 has the same width as the right support portion 42 of the support portion 4. The third casing 111 serves as a portion of the support portion 4. The third casing 111 is configured to be removably attached to the image forming apparatus 11. The third casing 111 is attached to the image forming apparatus 11 such that a rear surface of the third casing 111 contacts the front end surface 42A of the right support portion 42; a bottom surface of the third casing 111 contacts the top surface 25 of the first casing 2; and a left surface of the third casing 111 is flush with the left surface of the right support portion 42. The third casing 111 includes an incline surface 111A, an upper surface 111B, and a front surface 111C. The inclined surface 111A extends frontward and downward from a lower front end portion of the second casing 3. The upper surface 111B extends frontward from a front end portion of the incline surface 111A. The front surface 111C extends downward from a front end portion of the upper surface 111B.

The NFC indication 112 and the USB port 104 are disposed at different surfaces of the third casing 111 at different levels (e.g., at different positions in the up-down direction). In FIG. 8, the NFC indication 112 is provided at the incline surface 111A of the third casing 111. Similar to the second modification, the USB port 104 is disposed at the front surface 111C of the third casing 111. The USB indication 105 is provided at the front surface 111C of the third casing 111 near the USB port 104.

Using the NFC indication 112 as a guide, a user may bring an external device into proximity to the inclined surface 111A of the third casing 111, thereby establishing a wireless communication between the external device and the image forming apparatus 11. The USB indication 105 or the USB port 104 may help a user to recognize the location of the USB port 104. The NFC board 113 has the same or similar configuration as the NFC board 70 and is located inside the third casing 111, facing the NFC indication 112.

The configuration of the third modification may obtain effects similar to those of the second modification. In addition, a user may face the incline surface 111A of the third casing 111. This configuration may allow the user to readily identify the NFC indication 112 and bring an external device into proximity to the NFC indication 112.

What is claimed is:

1. An image forming apparatus, comprising:
   a first casing housing an image forming unit configured to form an image on a sheet, the first casing including a sheet discharge tray disposed at a top surface thereof, the sheet discharge tray being configured to support the sheet discharged by a discharge roller;
   a second casing disposed above the first casing, the second casing housing an image scanner configured to scan an image on a document;
   a support portion disposed at the top surface of the first casing such that the support portion raises the second casing, the support portion partially defining an opening that enables an access to the sheet discharged on the sheet discharge tray;
   an indication located at a portion of one of the top surface of the first casing and the support portion, the indication positioned outside the sheet discharge tray in a width direction perpendicular to a discharging direction of the sheet by the discharge roller, the indication indicating a location to which an external device is to be brought into proximity to establish short-range wireless communication between the image forming apparatus and the external device;
   a USB port disposed at a portion of one of the second casing and the support portion closer to the one end than the other end in the width direction, the USB port being located at a different position in an up-down direction from the indication; and
   a control panel configured to enable operations of the image forming apparatus, the control panel being located above the first casing,
   wherein the indication and the USB port are located between one end of the image forming apparatus and a center of the image forming apparatus in the width direction, and
   wherein the control panel is located between another end of the image forming apparatus, which is opposite to the one end of the image forming apparatus, and the center of the image forming apparatus.

2. The image forming apparatus according to claim 1, wherein the support portion has an end surface located between an upstream end surface of the second casing and a downstream end surface of the second casing in the discharging direction, and the USB port is disposed at the end surface of the support portion, and
   wherein the indication is located at the top surface of the first casing, and the indication is located at downstream of the USB port in the discharging direction.

3. The image forming apparatus according to claim 1, wherein the support portion includes a third casing configured to be removably attached to the support portion, and
   wherein the indication and the USB port are located at different surfaces of the third casing.

4. The image forming apparatus according to claim 3, wherein the third casing includes an inclined surface, and
   wherein the indication is located at the inclined surface.

5. The image forming apparatus according to claim 1, wherein the USB port is located at the second casing, and
wherein the indication is located at the top surface of the first casing, and the indication is located downstream of the USB port in the discharging direction.

6. The image forming apparatus according to claim 1, wherein the USB port is located at a position overlapping with the first casing when viewed from the top.

7. The image forming apparatus according to claim 1, further comprising a power switch located closer to the one end of the image forming apparatus in the width direction than the other end of the image forming apparatus in the width direction.

8. The image forming apparatus according to claim 1, further comprising a circuit board that enables the short-range wireless communication, the circuit board facing the indication.

9. The image forming apparatus according to claim 1, wherein the USB port is located higher than the indication, and the USB port is located upstream of the indication in the discharge direction.

10. The image forming apparatus according to claim 1, wherein the USB port is located lower than the indication, and the USB port is located downstream of the indication in the discharge direction.

11. An image forming apparatus, comprising:
    a first casing housing an image forming unit configured to form an image on a sheet, the first casing including a sheet discharge tray disposed at a top surface thereof, the sheet discharge tray being configured to support the sheet discharged by a discharge roller;
    a second casing disposed above the first casing, the second casing housing an image scanner configured to scan an image on a document;
    a support portion disposed at the top surface of the first casing such that the support portion raises the second casing, the support portion partially defining an opening that enables an access to the sheet discharged on the sheet discharge tray; and
    a third casing configured to be removably attached to the image forming apparatus, the third casing positioned outside the sheet discharge tray in a width direction perpendicular to a discharging direction of the sheet by the discharge roller, the third casing including an indication and a USB port that are located at different surfaces of the third casing, the indication indicating a location to which an external device is to be brought into proximity to establish short-range wireless communication between the image forming apparatus and the external device.

12. The image forming apparatus according to claim 11, wherein the third casing is positioned between the first casing and the second casing in an up-down direction.

13. The image forming apparatus according to claim 11, wherein the USB port is located at a different position in an up-down direction from the indication.

14. An image forming apparatus, comprising:
    a first casing housing an image forming unit configured to form an image on a sheet, the first casing including a sheet discharge tray disposed at a top surface thereof, the sheet discharge tray being configured to support the sheet discharged by a discharge roller;
    a second casing disposed above the first casing, the second casing housing an image scanner configured to scan an image on a document;
    a support portion disposed at the top surface of the first casing such that the support portion raises the second casing, the support portion partially defining an opening that enables an access to the sheet discharged on the sheet discharge tray;

an indication located at a portion of one of the top surface of the first casing and the support portion, the indication positioned outside the sheet discharge tray in a width direction perpendicular to a discharging direction of the sheet by the discharge roller, the portion being located closer to one end of the image forming apparatus in the width direction than the other end of the image forming apparatus opposite to the one end in the width direction, the indication indicating a location to which an external device is to be brought into proximity to establish short-range wireless communication between the image forming apparatus and the external device;

a USB port disposed at a portion of one of the second casing and the support portion closer to the one end than the other end in the width direction, the USB port being located at a different position in an up-down direction from the indication; and a power switch located closer to the one end of the image forming apparatus in the width direction than the other end of the image forming apparatus opposite to the one end in the width direction.

\* \* \* \* \*